US008092280B2

(12) United States Patent
Ishida et al.

(10) Patent No.: US 8,092,280 B2
(45) Date of Patent: Jan. 10, 2012

(54) GLASS SUBSTRATE FOR MAGNETIC DISK AND METHOD FOR PRODUCING THE SAME

(75) Inventors: Mizuho Ishida, Tokyo (JP); Norihito Shida, Ayutthaya (TH); Katsuhiro Matsumoto, Tokyo (JP); Kazuo Mannami, Ayutthaya (TH)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/628,484

(22) Filed: Dec. 1, 2009

(65) Prior Publication Data

US 2010/0136372 A1 Jun. 3, 2010

(30) Foreign Application Priority Data

Dec. 2, 2008 (JP) .................................. 2008-307633

(51) Int. Cl.
*B24B 7/19* (2006.01)
*C03B 17/00* (2006.01)
*G11B 5/65* (2006.01)

(52) U.S. Cl. ................ 451/59; 451/533; 51/297; 65/61; 428/848.9

(58) Field of Classification Search ............... 428/438.9, 428/323, 848.8, 846.9, 846.1; 451/41, 532, 451/28, 56, 21, 59, 4, 53, 592, 55; 360/131; 369/272.1; 438/304.4; 51/4, 306, 295, 285; 65/61, 111, 275
See application file for complete search history.

(56) References Cited

U.S. PATENT DOCUMENTS

| 6,932,677 B2 | 8/2005 | Nakano et al. |
| 7,014,534 B2 | 3/2006 | Oshima et al. |

(Continued)

FOREIGN PATENT DOCUMENTS

CN 101184582 5/2008

(Continued)

OTHER PUBLICATIONS

Chinese Office Action dated Jun. 30, 2011, in CN Application No. 200910252335.1.
Singaporean Office Action dated Oct. 19, 2010.

*Primary Examiner* — Kevin M. Bernatz
*Assistant Examiner* — Louis Falasco
(74) *Attorney, Agent, or Firm* — Oblon, Spivak, McClelland, Maier & Neustadt, L.L.P.

(57) ABSTRACT

The present invention relates to a method for producing a glass substrate for a magnetic disk, the method including a step of polishing a main surface of a circular glass plate while supplying a polishing slurry containing a polishing material, in which polishing is performed, after a polishing surface is subjected to dressing treatment, by using a polishing pad having: a first resin foam layer which forms the polishing surface, includes a resin foam having pores with a pore diameter of more than 20 μm and has a thickness of 400 μm or less; and a second resin foam layer which is provided between a platen for fixing the polishing pad and the first resin foam layer, includes a resin foam having pores with a pore diameter of 20 μm or less and has a thickness of 50 to 250 μm, and in which a total thickness of the first resin foam layer and the second resin foam layer is 550 μm or less, and a international rubber hardness degree of the polishing pad measured by the M method according to JIS K6253 is 40 IRHD or more.

11 Claims, 2 Drawing Sheets

U.S. PATENT DOCUMENTS

| | | |
|---|---|---|
| 2004/0180611 A1* | 9/2004 | Tajima et al. .................. 451/41 |
| 2004/0259480 A1 | 12/2004 | Hung et al. |
| 2005/0197050 A1* | 9/2005 | Prasad et al. .................. 451/41 |
| 2006/0002283 A1* | 1/2006 | Horisaka et al. ........... 369/272.1 |
| 2006/0046622 A1 | 3/2006 | Prasad |
| 2008/0081540 A1* | 4/2008 | Sato et al. .................. 451/28 |
| 2008/0171493 A1* | 7/2008 | Feng et al. .................. 451/59 |
| 2008/0209816 A1* | 9/2008 | Sung .............................. 51/295 |
| 2008/0292869 A1* | 11/2008 | Sung .............................. 428/323 |
| 2009/0158775 A1 | 6/2009 | Takizawa et al. |
| 2009/0239450 A1 | 9/2009 | Ishida et al. |
| 2009/0275268 A1 | 11/2009 | Ishida et al. |

FOREIGN PATENT DOCUMENTS

| | | |
|---|---|---|
| JP | 2005-66781 | 3/2005 |
| JP | 2005-120253 | 5/2005 |
| JP | 2005-149668 | 6/2005 |
| JP | 2005-203021 | 7/2005 |
| JP | 2006-92722 | 4/2006 |
| JP | 2006-99949 | 4/2006 |
| JP | 2007-87533 | 4/2007 |
| JP | 2007-160474 | 6/2007 |
| JP | 2007-250166 | 9/2007 |
| JP | 2007-257810 | 10/2007 |

* cited by examiner

GLASS SUBSTRATE FOR MAGNETIC DISK AND METHOD FOR PRODUCING THE SAME

FIELD OF THE INVENTION

The present invention relates to a glass substrate for a magnetic disk and a method for producing the same. More specifically, it relates to a method for polishing a main surface of a circular glass disk

BACKGROUND OF THE INVENTION

Recently, a demand for high recording density has been increased on a magnetic disk to be mounted on information processing devices such as a hard disk drive. Under such a situation, a glass substrate excellent in flatness and substrate strength has been widely used in place of conventional aluminum substrates.

The glass substrate for a magnetic disk is produced, for example, by cutting out a doughnut-shaped circular glass plate (a circular glass plate having a circular hole at the center thereof) from a glass plate, cutting an inner peripheral surface and an outer peripheral surface by using a diamond wheel, thereafter successively performing main surface lapping and edge surface mirror polishing, and polishing the main surface of the circular glass plate with a polishing pad.

In order to increase the storage capacity of the magnetic disk, it is necessary to widen the recording area. It is therefore desirable that the main surface of the circular glass plate is flat to the more outer peripheral side. However, so-called roll-off usually occurs, which is a phenomenon that the main surface is gradually inclined to an edge hereof to decrease the thickness of the glass plate as shown in FIG. 1 which is a cross-sectional view schematically showing the vicinity of the outer peripheral surface of the circular glass plate after polishing. The more the portion where this roll-off occurs is enlarged, the more the recording area decreases.

The shape of the edge of the circular glass plate is evaluated by the duboff value. The duboff value means the maximum distance (the value in a cross section of the circular glass plate) from a straight line by which any two points selected in a radial direction of the circular glass plate are connected to a surface of the circular glass plate, as shown in FIG. 1. A duboff value nearer to 0 shows that the shape of the edge is good.

A range in which the duboff value is measured can be arbitrarily set, as long as it is a range of an outer peripheral edge of the main surface of the circular glass plate, that is to say, a range in which head flying is inhibited when used as a HDD disk. For example, in the case of a glass substrate for a magnetic disk having a diameter of 65 mm, the duboff value (duboff 2) measured in a range of R 30 mm (R is the distance from the center) to R 32 mm (0.35 mm to 2.35 mm from an edge A to the center as shown in FIG. 1) and the duboff value (duboff 1) measured in a range of R 29.9 mm (R is the distance from the center) to R 31.5 mm (0.85 mm to 2.45 mm from an edge A to the center as shown in FIG. 1) are employed. Incidentally, the edge A is an edge of the polished main surface, and usually also one edge of a chamfered surface. For the duboff value, reference can be made to JP-A-2007-257810, JP-A-2007-87533, JP-A-2007-250166, JP-A-2005-203021, JP-A-2006-92722 and JP-A-2006-99949.

In order to increase the storage capacity as described above, it is essential to decrease the duboff value, and polishing pads have hitherto been improved. For example, it has been proposed that polishing is performed by using a polishing pad in which the Asker-A hardness is increased to 90 or more by allowing a polishing material to be contained in a specified amount (see JP-A-2007-250166).

SUMMARY OF THE INVENTION

In the polishing method described in JP-A-2007-250166, in order to eliminate unevenness of stress distribution at polishing generated by deformation of a polishing pad, the hardness of the polishing pad is increased, for example, the Asker-A hardness is increased to 90 or more, to improve the shape of an edge. However, when a polishing pad having a high hardness is used, there sometimes arise problems that that scratches on a main surface increases, that the degree of flatness deteriorates, that the polishing rate early decreases, and that duboff 1 deteriorates, in some cases. In addition to that, duboff 2 remarkably increases by polishing in many cases.

It is also considered to use a soft polishing pad. However, the circular glass plate deeply sinks in the polishing pad to result in that the length of a pad portion which strongly touches the substrate edge increases. Accordingly, both duboff 1 and duboff 2 remarkably increase in many cases.

Further, in order to increase the flatness of a main surface, the removal amount at the time of final polishing is usually increased. In association therewith, duboff 1, duboff 2 or both duboff 1 and duboff 2 tend to increase.

Accordingly, an object of the invention is to inhibit an increase in the duboff value while maintaining the flatness of a main surface, in a polishing step of the main surface of a circular glass plate, when a glass substrate for a magnetic disk is produced.

In order to solve the above-mentioned problems, the present inventors have made studies. As a result, it has been found that a circular glass plate is polished by relatively moving the circular glass plate and the polishing pads while supplying a slurry containing a polishing material in a state that top and bottom main surfaces are pressed with the polishing pads, and in this case, it is possible to decrease the duboff values (duboff 1 and duboff 2), (1) by increasing the hardness of the polishing pad as a whole to decrease the amount of change in a thickness direction and to inhibit the circular glass plate from sinking in the polishing pad, thereby preventing strong contact of an edge of the circular glass plate with the pad to decrease the length of a pad portion which strongly touches the edge of the circular glass plate, (2) by inhibiting a resin foam of a surface layer of the pad, to which shear stress is applied during polishing, from being elongated and contracted, and furthermore (3) by polishing in a state where the surface layer of the pad is not hardened by caking of the slurry to the surface layer, that is to say, in a state where the hardness of the surface layer of the pad is kept soft, thereby preventing strong pressing force from being applied to an edge surface of the circular glass plate which has sunk in the polishing pad.

Specific examples of methods for increasing the hardness of the polishing pad as a whole include a method of reducing the thickness of a resin foam layer in order to decrease the distance between a platen for holding the polishing pad and a polishing surface, a method of preparing the polishing pad with a resin foam having a high hardness.

Methods for inhibiting the resin foam of the surface layer of the pad, to which shear stress is applied during polishing, from being elongated and contracted include a method of inserting a material having a function of relaxing shear stress transmitted to the polishing surface during polishing, for example, a resin foam layer having a low amount of change (compressibility: 3% or less), between the polishing pad and the platen, a method of using a resin foam having such a high hardness that the pad surface is not elongated and contracted even when shear stress is applied thereto during polishing.

Further, methods for reducing a load applied to the edge surface of the circular glass plate which has sunk in the polishing pad include a method of removing by cleaning a foaming aid added in the production of the polishing pad, and then, performing polishing, thereby inhibiting aggregation of a polishing abrasive grain which occurs by a reaction of the foaming aid and the polishing abrasive grain and inhibiting the polishing pad from becoming hard by aggregation and caking of the abrasive grain to the surface of the polishing pad to inhibit deterioration of roll-off (from the beginning, a polishing pad produced by a raw material which is hard to induce aggregation of the polishing abrasive grain may be used). Further, a decrease in polishing rate can be inhibited by cleaning the foaming aid to inhibit aggregation of the polishing abrasive grain. Furthermore, it is expected to have effects on decreases in the residual abrasive grain and scratches which act as surface defects.

The present invention is based on such findings and is relates to the following items (1) to (5).

(1) A method for producing a glass substrate for a magnetic disk, the method comprising a step of polishing a main surface of a circular glass plate while supplying a polishing slurry containing a polishing material, wherein polishing is performed, after a polishing surface is subjected to dressing treatment, by using a polishing pad having: a first resin foam layer which forms the polishing surface, comprises a resin foam having pores with a pore diameter of more than 20 μm and has a thickness of 400 μm or less; and a second resin foam layer which is provided between a platen for fixing the polishing pad and the first resin foam layer, comprises a resin foam having pores with a pore diameter of 20 μm or less and has a thickness of 50 to 250 μm, and wherein a total thickness of the first resin foam layer and the second resin foam layer is 550 μm or less, and a international rubber hardness degree of the polishing pad measured by the M method according to JIS K6253 is 40 IRHD or more.

(2) The method for producing a glass substrate for a magnetic disk according to (1), wherein the second resin foam layer has a compressibility at 200 μm of 3% or less.

(3) The method for producing a glass substrate for a magnetic disk according to (1) or (2), wherein an open pore area ratio of the polishing surface is adjusted to 8% or more, and an average circle equivalent diameter of open pores of the polishing surface is adjusted to 10 μm or more, by the dressing treatment.

(4) The method for producing a glass substrate for a magnetic disk according to (1), (2) or (3), wherein after a surface layer of the polishing pad is cut off by the dressing treatment, brush cleaning is performed while supplying pure water.

(5) A glass substrate for a magnetic disk produced by the method for producing a glass substrate for a magnetic disk according to (1), (2), (3) or (4).

According to the invention, a glass substrate for a magnetic disk having small duboff values (duboff 1 and duboff 2), that is to say, having a wide recording area to make high storage capacity possible can be efficiently produced by a polishing pad having a specific structure.

The final removal amount can be increased, so that it becomes easy to remove defects such as scratches on the surface and foreign matter.

DETAILED DESCRIPTION OF THE INVENTION

The invention will be described below in detail.

In the method for producing a glass substrate for a magnetic disk of the invention, a circular glass plate is treated by a known step up to polishing of a main surface.

For example, a doughnut-shaped circular glass plate (a circular glass plate having a circular hole at the center thereof) from a glass plate, and chamfering, main surface lapping and edge surface mirror polishing are successively performed.

Further, the main surface lapping step may be divided into a rough lapping step and a precise lapping step, and a shape-processing step (hole formation at the center of the circular glass plate, chamfering and edge surface lapping) may be provided therebetween.

Incidentally, when the glass substrate having no hole at the center thereof is produced, the hole formation at the center of the circular glass plate is of course unnecessary.

Then, the main surface is polished. Polishing may be performed in the same manner as in conventional polishing methods. For example, the circular glass plate is put between two polishing pads, and the polishing pads are rotated while supplying a polishing slurry containing a polishing material to interfaces between the polishing pads and the circular glass plate, thereby performing polishing. Incidentally, a strengthening step such as chemical strengthening may be provided after the main surface polishing step. In the invention, the following polishing pad is used in polishing of the main surface.

That is to say, the polishing pad comprises a first resin foam layer (hereinafter referred to as a NAP layer) for forming a polishing surface and a second resin foam layer (hereinafter referred to as a lower layer) provided between a platen for fixing the polishing pad and the first resin foam layer.

Figure 1:
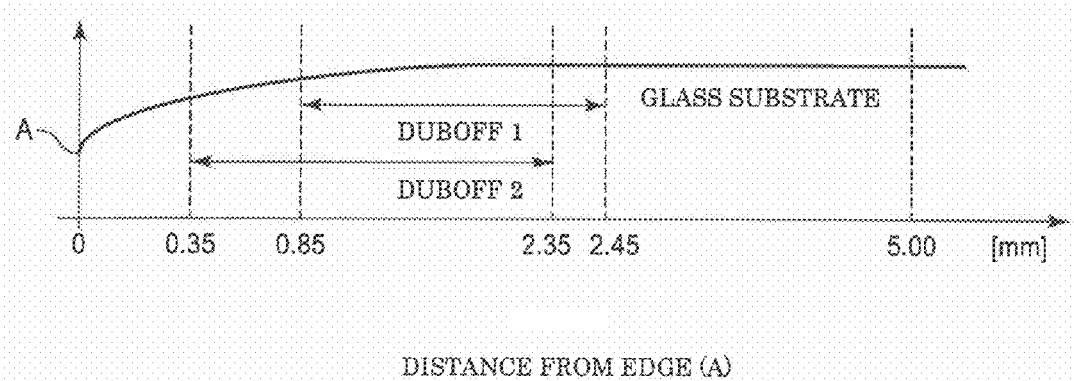
FIG. 1 is a schematic view showing a cross section in the vicinity of an outer peripheral portion of a circular glass plate polished, and a view for illustrating duboff 1 and duboff 2.
Figure 2:
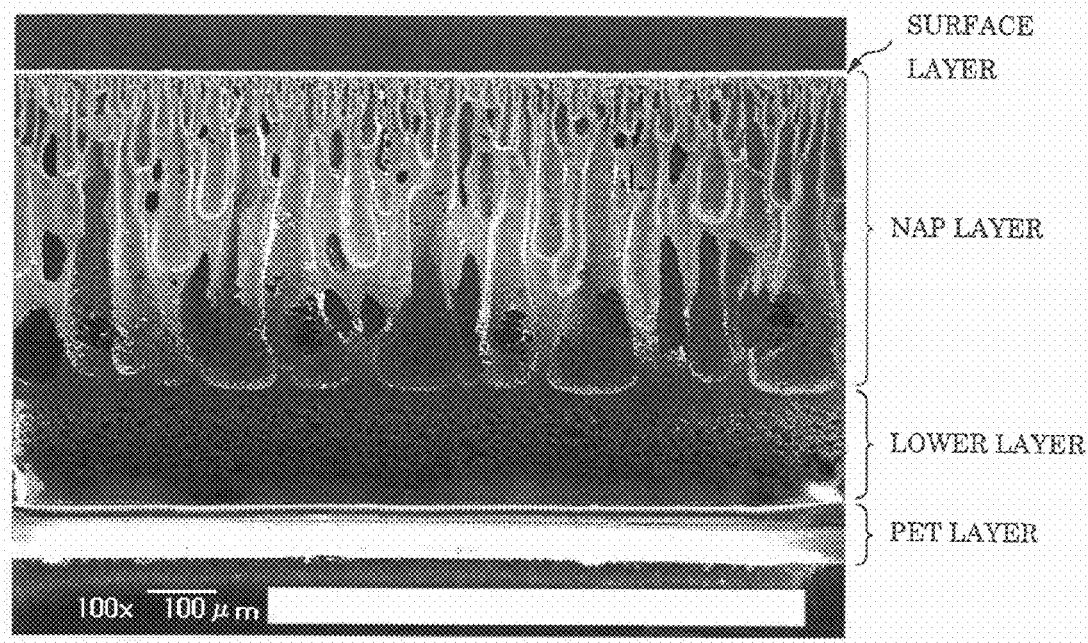
FIG. 2 is an electron photomicrograph of a cross section of a polishing pad, and a view for illustrating a NAP layer, lower layer and a PET layer.

FIG. 2 is an electron photomicrograph of a cross section of a commercially available polishing pad having such a two-layer resin foam layer, although not the polishing pad used in the invention.

A lowermost layer is a sheet or a film composed of a resin such as polyethylene terephthalate (PET), a nonwoven fabric or a woven fabric (designated as "PET LAYER" in the figure), and the polishing pad is joined to a platen of a polishing machine (not shown) by using, for example, a double-faced adhesive tape or the like, with the interposition of this PET layer.

On the PET layer, the two-layer of the resin foam layer comprising the lower layer and the NAP layer is formed, and pores in a surface layer of the resin foam layer are not opened at all or scarcely opened.

The resin foam layer of the polishing pad in the invention will be described below.

The lower layer comprises a low-foamed resin having a pore diameter of 20 μm or less, preferably 15 μm or less, and the thickness thereof is from 50 to 250 μm, and preferably from 100 to 250 μm. When the thickness of the lower layer is less than 50 μm, duboff 1 deteriorates. When it exceeds 250 μm, duboff 2 deteriorates.

Further, the resin foam for forming the lower layer has a compressibility at 200 μm of preferably 5% or less, more preferably 3% or less.

On the lower layer, there is provided a high-foamed resin having pores with a pore diameter higher than the lower layer, that is to say, with a pore diameter of more than 20 μm, in a thickness of 400 µm or less, preferably 350 µm or less, thereby forming the NAP layer. Incidentally, this thickness is the thickness before dressing treatment described later. The lower limit of the thickness is not restricted as long as the object of the invention is not impaired. However, the lower limit of the thickness is, for example, 100 µm, and typically from 200 to 250 µm. When the thickness of the NAP layer exceeds 400 µm, duboff 2 deteriorates.

The pore of the NAP layer typically has an elongated cylindrical shape as shown in FIG. 2. However, for the pore not having such a cylindrical shape, the longest diameter of the pore is taken as the pore diameter thereof.

Further, the total thickness of the NAP layer and the lower layer is 550 µm or less, and preferably 500 µm or less, as the thickness before dressing treatment described later. When the total thickness of the polishing pad exceeds 550 µm, since the NAP layer or the lower layer exceeds the above-mentioned specified thickness, duboff 1, duboff 2 or both duboff 1 and duboff 2 deteriorate.

Although there is no restriction on the resin for forming the NAP layer and the lower layer, a polyurethane resin is common. Further, in order to obtain such a polishing pad, reference can be made, for example, to JP-A-2008-36786.

That is to say, first, a polyurethane resin, N,N-dimethylformamide (DMF) as a water-miscible organic solvent which can dissolve the polyurethane resin, and additives are mixed to dissolve the polyurethane resin. The polyurethane resin is selected from polyester-based, polyether-based and polycarbonate-based resins and the like to use, and dissolved in DMF to a predetermined concentration. As the additives, there can be used a pigment such as black carbon for controlling the size or amount (number) of pores, a hydrophilic activator for accelerating foaming, a hydrophobic activator for stabilizing coagulation and regeneration of the polyurethane resin, and the like. After agglomerates and the like are removed by filtering the resulting solution, defoaming is performed under vacuum (reduced pressure) to obtain a polyurethane resin solution.

Next, the resulting polyurethane resin solution is continuously applied to a film forming base material, and immersed in an aqueous coagulating liquid to coagulate and regenerate the polyurethane resin, followed by drying after cleaning to obtain a first polyurethane sheet for the NAP layer.

On the other hand, in order to produce a second polyurethane sheet for the lower layer, first, the polyurethane resin, DMF, additives and an adjusting organic solvent for foaming adjustment are blended. After the polyurethane resin, DMF and the additives are mixed to dissolve the polyurethane resin, a predetermined amount of the adjusting organic solvent is added in order to delay substitution of DMF with water at the time of coagulation and regeneration, thus obtaining a resin emulsion. As the adjusting organic solvent, a solvent having a smaller solubility in water than DMF and homogeneously miscible or dispersible in the solution in which the polyurethane resin is dissolved, without causing coagulation (gelation) of the polyurethane resin dissolved in DMF can be used. Specific examples thereof include ethyl acetate and isopropyl alcohol. The size or amount (number) of pores formed inside of the polyurethane sheet can be controlled, and the compressibility of the polyurethane sheet can be adjusted, by changing the amount of the adjusting organic solvent added. For example, in order to set the compressibility of the polyurethane sheet to 3% or less, the amount of the adjusting organic solvent added is preferably within the range of 20 to 45 parts by mass based on 100 parts by mass of the resin emulsion.

Then, the film forming base material coated with the resin emulsion is introduced in the coagulating liquid, thereby coagulating and regenerating the polyurethane resin. In the coagulating liquid, a skin layer is first formed on the surface side of the resin emulsion similarly to a skin layer of the first polyurethane sheet. However, the adjusting organic solvent is added to the resin emulsion, so that the progress of the substitution of DMF and the adjusting organic solvent in the resin emulsion with the coagulating liquid becomes slow. For this reason, at the inner side from the skin layer formed on the surface side of the resin emulsion, nearly even pores having a pore diameter smaller than that of pores formed in a pore layer of the first polyurethane sheet and larger than that of micropores formed in the skin layer are usually formed.

Here, the formation of pores of the first polyurethane sheet and pores of the second polyurethane sheet will be described. DMF used for dissolving the polyurethane resin is a solvent generally used for dissolving a polyurethane resin, and can be mixed with water at any ratio. For this reason, when the polyurethane resin solution is immersed in the coagulating liquid in the preparation of the first polyurethane sheet, the substitution of DMF with the coagulating liquid (coagulation and regeneration of the polyurethane resin) first occurs at the surface of the polyurethane resin solution to form micropores of the skin layer. Accordingly, extremely fine open pores are formed on the surface of the skin layer, associated with the substitution of DMF with the coagulating liquid. Thereafter, the coagulating liquid enters the inside of the polyurethane resin solution from portions where it is easy to enter, so that portions where the substitution of DMF with the coagulating liquid rapidly progresses and portions where it is delayed are generated to form relatively large pores. DMF is eluted only from the surface side (skin layer side) of the polyurethane resin solution by using as the film forming base material a PET film (acting as the PET layer) which the coagulating liquid does not penetrate. Accordingly, the pores form a triangular pyramid shape in which the film forming base material side of the pore is large and rounded. Further, the micropores formed in the skin layer and the pores formed in the pore layer are formed associated with desolvation of DMF, so that they are communicated with one another in a three-dimensional net-like shape by continuous pores having a pore diameter larger than that of the micropores formed in the skin layer and smaller than that of the pores formed in the pore layer.

On the other hand, in the preparation of the second polyurethane sheet, the adjusting organic solvent is added after the polyurethane resin is dissolved to form the resin emulsion. The adjusting organic solvent has a smaller solubility in water than DMF, so that it is eluted in the coagulating liquid (water) later than DMF. Further, in the resin emulsion, the amount of DMF is decreased by the amount of the adjusting organic solvent added. For this reason, the substitution rate of DMF and the adjusting organic solvent with the coagulating liquid becomes slow, so that the formation of such pores as in the first polyurethane sheet is inhibited, and at the inner side from the skin layer of the second polyurethane sheet, pores are formed in a state where they are nearly evenly dispersed. Accordingly, the pore diameter of the pores is usually smaller than that of the pores formed in the pore layer of the first polyurethane sheet and larger than that of the micropores formed in the skin layer. Further, the micropores of the skin layer and the pores are formed associated with desolvation of DMF and the adjusting organic solvent, so that they are communicated with one another in a three-dimensional net-like shape by continuous pores having a pore diameter larger than that of the micropores and smaller than that of the pores.

Then, the first polyurethane sheet and the second polyurethane sheet are joined to each other. In this joining step, the first and second polyurethane sheets are each separated from the film forming base material, and the second polyurethane sheet is joined to an opposite side surface of the skin layer of the first polyurethane sheet. For joining, a joining solution in which a small amount of the polyurethane resin is dissolved in DMF can be used. As this polyurethane resin, the same polyurethane resin as used in the first and second polyurethane sheets is used. The amount of the polyurethane resin dissolved is, for example, from about 1 to about 5%. Then, the first and second polyurethane sheets are allowed to contact with each other through the joining solution, and heated under pressure, whereby DMF is volatilized to join the first and second polyurethane sheets to each other through the polyurethane resin.

After joining, buffing treatment is performed to a surface opposite to the surface of the second polyurethane sheet to which the first polyurethane sheet is joined. In the first and second polyurethane sheets, variations in thickness occur at the time of film formation, and unevenness is formed on the surfaces thereof. This unevenness is removed by the buffing treatment.

In the above-mentioned polishing pad, the international rubber hardness degree measured by the M method according to JIS K6253 at the time of allowing pure water to be contained (wet state) before subjected to polishing is adjusted to 40 IRHD or more, preferably to 42 IRHD or more. This international rubber hardness degree is measured by using a micro-size international rubber hardness degree meter. A plunger having lower edge being a spherical surface with a diameter of 0.4 mm is allowed to contact perpendicularly with a polishing surface of the polishing pad at 8.3 mN for 3 seconds (primary load), and then, pressed therein at 153.3 mN for 30 minutes (full load). The international rubber hardness degree is determined from the press-in depth amount at the time of full load. Incidentally, the international standard corresponding to JIS K6253 is DIN ISO 48.

Further, the surface layer of the polishing pad is subjected to dressing treatment, thereby adjusting the open pore area ratio of the polishing surface (the contact surface with the circular glass plate) preferably to 8% or more, more preferably to 9 to 40%, and adjusting the average circle equivalent diameter of open pore (average open pore diameter) preferably to 10 μm or more, more preferably to 20 to 30 μm. The polishing pad adjusted as described above is used. The dressing treatment can be performed by known methods. For example, the surface layer of the polishing surface of the polishing pad is cut off to a predetermined depth, generally tens to hundreds of micrometers, by using a dressing plate to which diamond grain is fixed.

The polishing pad just after production contains a number of pores in the inside thereof, and a number of fine pores which are the pores opened by the dressing treatment are formed in the polishing surface. In the invention, the proportion of the fine pores to the whole surface of the polishing surface is taken as the open pore area ratio. Further, the open pore is not limited to a true circle, and exhibits an elliptical or complicated shape. The diameters are calculated from the open pore areas of the respective open pores to determine the circle equivalent diameters, and the average thereof is taken as the average circle equivalent diameter of open pores (average open pore diameter). When the open pore area ratio is less than 8%, polishing resistance increases to cause the possibility of breakage of the circular glass plate during polishing. Further, a problem also arises that the polishing slurry containing the polishing material is not efficiently supplied to the interface between the polishing pad and the circular glass plate. When the average open pore diameter is less than 10 μm, there are problems that resistance at the time of polishing is high, resulting in failure to perform stable polishing, and that the slurry is not efficiently supplied to the interface between the polishing pad and the glass. On the other hand, when the average open pore diameter is too large, the polishing surface is dotted with large open pores, resulting in failure to homogeneously perform polishing, which causes deterioration of surface characteristics.

Incidentally, the open pore area ratio and the average circle equivalent diameter of the surface layer of the polishing pad was calculated by taking a laser microscope image (manufactured by Keyence Corporation, a color 3D laser microscope, VK-9700, VK-9710) of the treated surface and using an image analyzer (manufactured by Keyence Corporation, analysis application, VK-H1A1).

Further, the resin foam is produced by allowing a resin in which a foaming aid is incorporated to foam. Of materials used in the foaming aid, there is a surfactant having high hydrophobicity which causes aggregation of the polishing material in the polishing slurry. When the surfactant having high hydrophobicity remains in the polishing pad, it aggregates the polishing material of the polishing slurry. Accordingly, in the invention, it is preferred to clean the polishing pad after the dressing treatment to discharge the remaining high-hydrophobic surfactant as much as possible. Specifically, it is preferred that after a surface layer of the polishing pad is cut off by the dressing treatment, brush cleaning is performed while supplying pure water. In that case, when the open pore area ratio is less than 8%, or the average open pore diameter is less than 10 μm, the discharge of the remaining high-hydrophobic surfactant by cleaning can not be performed efficiently and sufficiently. Incidentally, the discharge degree of the remaining high-hydrophobic surfactant by cleaning can be evaluated from the surface tension of a cleaning liquid or the polishing slurry. When the static surface tension is 70 mN/m or more, it can be said to be good.

The above-mentioned surfactants having high hydrophobicity include, for example, nonionic surfactants to which an alkyl chain having 3 or more carbon atoms (polyoxyethylene alkyl ethers, polyoxypropylene alkyl ethers, polyoxyethylene polyoxypropylene alkyl ethers, perfluoroalkyl ethylene oxide adducts, glycerin fatty acid esters, propylene glycol fatty acid esters and the like) and anionic surfactants (alkyl carboxylic acids).

Further, also when polyvinyl alcohol or polyvinyl pyrrolidone as a nonionic water-soluble polymer or a phenyl group-containing acrylic acid-based copolymer (such as a styrene-maleic acid-based polymer) as an anionic water-soluble polymer remains in the polishing pad, it is preferred to remove this by cleaning.

Incidentally, when the polishing pad is used in which no surfactant having high hydrophobicity is used and only a surfactant having high hydrophilicity is used, as the foaming aid, cleaning is usually unnecessary.

There is no restriction on the polishing slurry, and known ones can be used. Generally, there are used polishing slurries in which a colloidal silica or a fumed silica is used as the polishing material and various additives are incorporated for enhancing polishing efficiency, and can also be used in the invention. An example of the polishing slurry is shown below.

The colloidal silica is obtained by a water glass method using an alkali metal silicate such as sodium silicate as a raw material and performing a condensation reaction in an aqueous solution to allow particles to grow, or an alkoxy silane method using an alkoxysilane such as tetraalkoxysilane as a raw material and performing a condensation reaction in water containing a water-soluble organic solvent such as an alcohol to allow particles to grow.

The fumed silica is obtained by a gas phase method using a volatile silicon compound such as silicon tetrachloride as a raw material and performing hydrolysis under a high temperature of 1000° C. by using an oxygen-hydrogen burner to allow particles to grow.

Besides, there can be used ones obtained by surface-modifying these silicas with functional groups, ones in which the surface functional group state, the zeta potential and the particle hardness are modified by doping the silicas with another element such as aluminum, ones composited with a surfactant or other particles, and the like.

Above all, the colloidal silica is preferred from the viewpoint of decreasing the surface roughness and scratches of the substrate surface. These silicas may be used either alone or as a mixture of two or more thereof.

The primary particles of these silicas have an average particle size of 1 to 100 nm. The average particle size is preferably from 1 to 80 nm, more preferably from 3 to 60 nm and still more preferably from 5 to 40 nm, from the viewpoints of decreasing scratches, decreasing the surface roughness and securing the polishing rate. Incidentally, in the invention, the polishing rate is preferably higher and is preferably 0.03 µm/min or more. Further, the surface roughness (Ra) measured with an AFM (atomic force microscope) is preferably smaller and is preferably 0.2 nm or less. Micro-waviness (µWa) measured with a scanning white light interferometer is preferably smaller and is preferably 0.2 nm or less.

Further, the content of these silicas in the polishing slurry is typically from 5 to 40% by mass.

The polishing slurry may be adjusted to acidity by adding an acid, or may be alkalified by adding an alkali. There is no restriction on the degree of acidity and the degree of alkalinity, and polishing may be performed at a suitable pH corresponding to the purpose of polishing within the range of pH 1 to 14. As the acid used, an inorganic acid such as nitric acid, hydrochloric acid or sulfuric acid, or an organic acid may be used. As the alkali used, a salt which is dissolved in water to show alkalinity, such as sodium hydroxide, potassium hydroxide, ammonium, sodium carbonate or sodium hydrogen carbonate may be used. In order to inhibit fluctuations in pH (an increase in pH and a decrease in pH) during polishing, adjustment may be made by imparting a buffer effect to the polishing slurry.

As the additives, materials which are non-charged (non-ionic) or negatively charged (anionic) in water are preferred from the viewpoint of cleanability. For example, anionic polymers, polyhydric alcohols (ethylene glycol, glycerol, sorbitol, mannitol, diglycerol and the like) and organic acids (gluconic acid, citric acid, malic acid, succinic acid, tartaric acid, acetic acid, oxalic acid and the like) for dry prevention, anionic polymers, saccharides (trehalose, Finetose, pullulan and the like), cellulosic polymers (hydroxyethyl cellulose, hydroxypropyl cellulose, carboxymethyl cellulose and the like) and phenyl group- or naphthalene group-containing polymers (polystyrenesulfonic acid phenolsulfonic acid-formalin condensates, naphthalenesulfonic acid-formalin condensates and the like) for covering the glass surface or the abrasive grain surface to protect it, thereby performing selective polishing, anionic surfactants (alkyl sulfonic acids, alkylbenzene sulfonic acids, alkylnaphthalene sulfonic acid, alkyl diphenyl ether sulfonic acids, arylphenol sulfonic acid-formaldehyde condensates, dibutylnaphthalene sulfonic acids and the like) for decreasing the surface tension of the polishing slurry, and the like may be added in suitable amounts.

Although the polishing conditions are also not particularly restricted, for example, the polishing pressure is preferably 3 kPa or more. A polishing pressure of less than 3 kPa results in a decrease in stability of the circular glass plate at the time of polishing to tend to flap. As a result, there is the possibility of increased waviness of the main surface. Further, the removal amount of the main surface is suitably from 0.3 to 1.5 µm, and controlled by adjusting the supply amount of the polishing slurry, the silica concentration in the polishing slurry, the polishing pressure, the number of rotation and the like.

Incidentally, the main surface may be preliminarily polished before the above-mentioned polishing of the main surface. This preliminary polishing of the main surface can be performed, for example, by putting the circular glass plate between polishing pads, and rotating the polishing pads while supplying a cerium oxide abrasive grain slurry or a silica abrasive grain slurry.

Then, after the above-mentioned polishing of the main surface, cleaning and drying are performed to obtain the glass substrate for a magnetic disk. The cleaning and drying are performed by known methods. For example, immersion in an acidic detergent solution, a neutral detergent solution or an alkaline detergent solution, scrub cleaning with Belclean and an alkali detergent or an acid detergent, ultrasonic cleaning in a state immersed in an alkaline detergent solution and ultrasonic cleaning in a state immersed in pure water are in turn performed, followed by drying by a method such as isopropyl alcohol vapor drying or spin-dry drying.

Incidentally, the polishing pad which has performed polishing becomes hard by aggregation and caking of the polishing material to the polishing surface, so that the above-mentioned international rubber hardness degree measured by the M method increases compared to that before polishing. For this reason, the polishing pad is subjected to the dressing treatment in the same manner as described above to cut off the hardened polishing surface, thereby exposing a newly formed surface without caked polishing material and regenerating a soft polishing surface, which reduces a load applied to the edge of the glass plate which has sunk in the polishing pad and makes it possible to use the polishing pad again for polishing.

EXAMPLES

The invention will be further described below with reference to examples and comparative examples, but should not be construed as being limited thereto.

Preparation of Test Article

A silicate glass plate formed by a float method was processed to such a doughnut-shaped circular glass plate (a circular glass plate having a circular hole at the center thereof) as to obtain a glass substrate for magnetic disk having an outer diameter of 65 mm, an inner diameter of 20 mm and a plate thickness of 0.635 mm.

Inner and outer peripheral edge surfaces of this doughnut-shaped circular glass plate were chamfered to a width of chamfer of 0.15 mm and an angle of chamfer of 45°. Thereafter, lapping of upper and lower surfaces of the glass plate was performed by using an aluminum oxide abrasive grain, and the abrasive grain was removed by cleaning.

Then, mirror polishing of the edge surfaces chamfered was performed by brush polishing using a cerium oxide slurry as a polishing material and a brush as a polishing instrument, and cerium oxide was removed by cleaning. The removal amount was 40 urn in total in the radical direction.

Thereafter, polishing processing of the upper and lower main surfaces was performed with a double-sided polishing machine using a cerium oxide slurry (average particle size of cerium oxide: about 1.1 μm) as a polishing material and a hard urethane pad as a polishing instrument, and cerium oxide was removed by cleaning. The removal amount was 35 μm in total in the thickness direction of the upper and lower main surfaces.

Further, polishing processing of the upper and lower main surfaces was performed with a double-sided polishing machine using cerium oxide (average particle size: about 0.5 μm) having a smaller average particle size than the above-mentioned cerium oxide as a polishing material and a soft urethane pad as a polishing instrument, and cerium oxide was removed by cleaning. The removal amount was 4 μm in total in the thickness direction of the upper and lower surfaces.

Polishing Pad

Foamed polyurethane polishing pads each having a pad layer thickness and a pad hardness shown in Table. 1 were prepared. As a lower layer, one having a compressibility of 3% or less at a thickness of 200 μm was used. The compressibility was determined by using a schopper type thickness tester (a pressurizing surface was circular with a diameter of 1 cm) according to the Japanese Industrial Standards (JIS L 1021). Specifically, the thickness t0 after pressurized at an initial load for 30 seconds was measured, and then, the thickness t1 after allowed to stand for 5 minutes under a final pressure. The compressibility was calculated from the following equation: the compressibility (%)=(t0−t1)/t0×100. At this time, the initial load was 100 g/cm$^2$, and the final pressure was 1120 g/cm$^2$ (see JP-A-2008-36786). Further, the thicknesses of an NAP layer and the lower layer were determined from an SEM observed image of a cross section (manufactured by Keyence Corporation, a 3D real surface view microscope, VE-9800).

Further, the hardness of each polishing pad was measured by the following procedure. That is to say, the polishing surface of the polishing pad was subjected to buffing treatment using a dresser to which a diamond abrasive grain was fixed to open pores, and then, cleaning is thoroughly performed with pure water to remove pad swarf and the additive (surfactant) used in the production of the polishing pad. Thereafter, the international rubber hardness degree was measured by the above-mentioned M method in a state where pure water was allowed to be sufficiently contained. Incidentally, the international rubber hardness degree measured by the above-mentioned M method was measured with an IRHD-micro hardness meter (a general-purpose automatic hardness meter for rubber, Digitest IRHD Micro, manufactured by H. Bareis Company) using an IRHD micro detector.

The polishing pad was fixed to a platen of the polishing machine, and the polishing surface thereof was subjected to the dressing treatment using the dressing plate to which diamond grain was fixed to cut off the surface layer. The dressing treatment was carried out in a step where dressing was performed under reverse rotation of the dressing plate and then under normal rotation thereof, and thereafter, brush cleaning was performed while supplying pure water. The polishing surface was dress-treated to an average open pore diameter of 10 μm, thereby adjusting the polishing surface of the polishing pad.

Polishing of Glass Plate

Using the polishing machine to which the dressing-treated polishing pad was attached, the polishing pad was cleaned with water, and then, the test article was polished. In the polishing slurry, a colloidal silica slurry (average particle size of primary particles: 20 to 30 nm, concentration of silica particles: 48% by mass) was used as a raw material. The concentration of silica in the polishing composition was adjusted to 15% by mass with pure water, and the pH was adjusted to 4 to 5 with citric acid and sodium citrate. A 16B type double-sided polishing machine manufactured by Hamai Co., Ltd. was used as the polishing machine, and polishing was performed at a polishing pressure of 12 kPa, a carrier peripheral velocity of 40 m/min and a polishing slurry supply rate of 120 ml/min for 5 minutes, 10 minutes and 20 minutes, respectively. The removal amount was controlled by the polishing time. Then, for the test article which was polished, immersion in an acidic detergent solution, scrub cleaning with Belclean and an alkali detergent, ultrasonic cleaning in a state immersed in an alkaline detergent solution and ultrasonic cleaning in a state immersed in pure water are in turn performed, followed by drying with IPA vapor.

Then, the duboff values (duboff 1 and duboff 2) of the test article were measured by using a scanning white light interferometer, New View 7300, manufactured by Zygo Corporation, for each termination of polishing. Measurement was made for 5 substrates per batch (100 substrates), and substrate edge surface measurement was made at top surface and a bottom surface of each substrate, at 10 places in total. Further, the removal amount was determined by measuring the weights of 5 test articles before and after polishing for each polishing batch (a value of a decrease in weight divided by the surface area of the substrate and the specific gravity of glass (2.47)). Then, the removal amount (one surface side) determined by the weight method was plotted on the abscissa, and the average value of the duboff values (duboff 1 and duboff 2) was plotted on the ordinate. From a slope of a linear approximation formula thereof, the removal amount dependency of the duboff value was evaluated, thereby evaluating polishing pad characteristics.

The polishing pad which does not increase in the duboff values (duboff 1 and duboff 2), even when the removal amount increases, is an excellent polishing pad having a high effect of inhibiting duboff deterioration. For duboff 2, one having a slope of the linear approximation formula of 15 or less is judged as "good", and for duboff 1, one having a slope of the linear approximation formula of 2.5 or less is judged as "good". The polishing pad satisfying both the characteristics is the excellent polishing pad having the high effect of inhibiting duboff deterioration.

As shown in Table 1, the circular glass plate is inhibited from sinking in the polishing pads, and the surface layers of the polishing pads are inhibited from being elongated and contracted during polishing to show good duboff values, that is to say, both the characteristics of duboff 1 and duboff 2 (Examples 1 to 3) by adjusting the total thickness of the polishing pads to 550 μm or less, the thickness of the NAP layers to 400 μm or less, the thickness of the lower layers to 50 to 250 μm, opening the pores by the dressing treatment, and adjusting the international rubber hardness degree by the M method in a state where pure water is allowed to be contained to 40 IRHD or more, according to the invention. Both the duboff values of the polishing pads not satisfying the above-mentioned conditions are insufficient (Comparative Examples 1 to 11).

Further, the surface roughness (Ra) was measured with an AFM, and the surface waviness (μWa) was measured with a scanning white light interferometer. In Examples and Comparative Examples, the surface roughness (Ra) was 0.2 nm or less in all polishing batches, and the surface waviness (μWa) was 0.2 nm or less in all polishing batches.

TABLE 1

|  |  | Example 1 | Example 2 | Example 3 |
|---|---|---|---|---|
| Pad Layer Thickness (μm) | Lower Layer | 150 | 200 | 75 |
|  | NAP Layer | 300 | 300 | 310 |
|  | Total Thickness | 450 | 500 | 385 |
| Pad Hardness (IRHD-M) |  | 46 | 49 | 50 |
| Duboff 2/Removal Amount (a) |  | 6 | 11 | 5 |
| Judgment (Good: 15 > a) |  | Good | Good | Good |
| Duboff 1/Removal Amount (a) |  | 1 | 0 | 2 |
| Judgment (Good: 2.5 > a) |  | Good | Good | Good |
| Overall Judgment |  | Good | Good | Good |

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Pad Layer Thickness (μm) | Lower Layer | 170 | 185 | 0 | 0 | 385 | 0 |
|  | NAP Layer | 495 | 460 | 460 | 285 | 320 | 475 |
|  | Total Thickness | 665 | 645 | 460 | 285 | 705 | 475 |
| Pad Hardness (IRHD-M) |  | 30 or less | 30 or less | 36 | 53 | 47 | 46 |
| Duboff 2/Removal Amount (a) |  | 39 | 23 | 14 | 10 | 34 | 13 |
| Judgment (Good: 15 > a) |  | Poor | Poor | Good | Good | Poor | Good |
| Duboff 1/Removal Amount (a) |  | 0.1 | −1 | 4 | 3 | 7 | 3 |
| Judgment (Good: 2.5 > a) |  | Good | Good | Poor | Poor | Poor | Poor |
| Overall Judgment |  | Poor | Poor | Poor | Poor | Poor | Poor |

|  |  | Comp. Ex. 7 | Comp. Ex. 8 | Comp. Ex. 9 | Comp. Ex. 10 | Comp. Ex. 11 |
|---|---|---|---|---|---|---|
| Pad Layer Thickness (μm) | Lower Layer | 225 | 115 | 0 | 200 | 0 |
|  | NAP Layer | 500 | 495 | 290 | 500 | 705 |
|  | Total Thickness | 725 | 610 | 290 | 700 | 705 |
| Pad Hardness (IRHD-M) |  | 44 | 45 | 45 | 41 | 35 |
| Duboff 2/Removal Amount (a) |  | 30 | 26 | 11 | 24 | 31 |
| Judgment (Good: 15 > a) |  | Poor | Poor | Good | Poor | Poor |
| Duboff 1/Removal Amount (a) |  | 1 | 3 | 3 | 1 | 1 |
| Judgment (Good: 2.5 > a) |  | Good | Poor | Poor | Good | Good |
| Overall Judgment |  | Poor | Poor | Poor | Poor | Poor |

While the invention has been described in detail and with reference to specific embodiments thereof, it will be apparent to one skilled in the art that various changes and modifications can be made therein without departing from the spirit and scope thereof.

This application is based on Japanese Patent Application (Patent Application No. 2008-307633) filed on Dec. 2, 2008, the entirety of which is incorporated herein by way of reference.

All references cited herein are incorporated by reference herein in their entirety.

What is claimed is:

1. A method for producing a glass substrate for a magnetic disk, said method comprising a step of polishing a main surface of a circular glass plate while supplying a polishing slurry containing a polishing material,
wherein polishing is performed, after a polishing surface is subjected to dressing treatment, by using a polishing pad having: a first resin foam layer which forms the polishing surface, comprises a resin foam having pores with a pore diameter of more than 20 μm and up to 40 μm has a thickness of 300 to 350 μm; and a second resin foam layer which is provided between a platen for fixing the polishing pad and the first resin foam layer, comprises a resin foam having pores with a pore diameter of 10 to 20 μm and has a thickness of 75 to 200 μm,
and wherein a total thickness of the first resin foam layer and the second resin foam layer is 375 to 550 μm, and a international rubber hardness degree of the polishing pad measured by the M method according to JIS K6253 is 42 to 50 IRHD.

2. The method for producing a glass substrate for a magnetic disk according to claim 1, wherein the second resin foam layer has a compressibility at 200 μm of 3% or less.

3. The method for producing a glass substrate for a magnetic disk according to claim 1, wherein an open pore area ratio of the polishing surface is adjusted to 8% or more, and an average circle equivalent diameter of open pores of the polishing surface is adjusted to 10 μm or more, by the dressing treatment.

4. The method for producing a glass substrate for a magnetic disk according to claim 1, wherein after a surface layer of the polishing pad is cut off by the dressing treatment, brush cleaning is performed while supplying pure water.

5. The method for producing a glass substrate for magnetic disk according to claim 1, wherein the first resin foam layer and the second resin foam layer are joined through a joining solution.

6. The method for producing a glass substrate for magnetic disk according to claim 1, wherein the polishing material is a colloidal silica or a fumed silica.

7. The method for producing a glass substrate for magnetic disk according to claim 1, wherein the first resin foam layer comprises polyurethane.

8. The method for producing a glass substrate for magnetic disk according to claim 1, wherein the second resin foam layer comprises polyethylene terephthalate.

9. The method for producing a glass substrate for magnetic disk according to claim 1, wherein the total thickness of the first resin foam layer and the second resin foam layer is 375 to 500 μm.

10. The method for producing a glass substrate for magnetic disk according to claim 1, wherein the second resin foam layer has a thickness of 100 to 200 μm.

11. The method for producing a glass substrate for magnetic disk according to claim 1, wherein the international rubber hardness degree of the polishing pad measured by the M method according to JIS K6253 is 46-49 IRHD.

* * * * *